United States Patent
Ai

(10) Patent No.: US 7,886,858 B2
(45) Date of Patent: Feb. 15, 2011

(54) HIGH REDUCTION RATIO ELECTRIC HUB DRIVE

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 631 days.

(21) Appl. No.: 11/813,625

(22) PCT Filed: Jan. 10, 2006

(86) PCT No.: PCT/US2006/000739

§ 371 (c)(1),
(2), (4) Date: Jul. 10, 2007

(87) PCT Pub. No.: WO2006/076321

PCT Pub. Date: Jul. 20, 2006

(65) Prior Publication Data

US 2008/0202832 A1      Aug. 28, 2008

(51) Int. Cl.
*B60K 7/00*      (2006.01)
*B60K 17/04*      (2006.01)

(52) U.S. Cl. ................................ 180/65.51; 180/65.6

(58) Field of Classification Search ............. 180/65.51, 180/65.6, 54.1, 60
See application file for complete search history.

(56) References Cited

U.S. PATENT DOCUMENTS

| | | | |
|---|---|---|---|
| 2,039,513 A * | 5/1936 | Baker ..................... | 180/65.51 |
| 2,258,328 A * | 10/1941 | Lee et al. .................... | 180/253 |
| 2,348,053 A * | 5/1944 | Bowker ....................... | 318/56 |
| 3,439,551 A | 4/1969 | Miltana | |
| 4,043,226 A | 8/1977 | Buuck | |
| 5,067,932 A * | 11/1991 | Edwards ......................... | 475/5 |
| 5,382,854 A | 1/1995 | Kawamoto et al. | |
| 6,080,077 A | 6/2000 | Kamlukin | |
| 6,974,399 B2 * | 12/2005 | Lo ............... | 475/5 |
| 7,105,965 B2 * | 9/2006 | Mantovani ............... | 310/75 C |
| 7,420,301 B2 * | 9/2008 | Veny et al. ................ | 310/75 C |
| 7,641,010 B2 * | 1/2010 | Mizutani et al. ......... | 180/65.51 |
| 2009/0032321 A1 * | 2/2009 | Marsh et al. ............. | 180/65.51 |

FOREIGN PATENT DOCUMENTS

| | | |
|---|---|---|
| DE | 682275 | 10/1939 |
| DE | 8426089 | 6/1985 |
| EP | 0388207 | 3/1990 |
| EP | 0388207 | 9/1990 |

OTHER PUBLICATIONS

International Preliminary Report/Written Opinion for PCT/US2006/000739, filed Jan. 10, 2006—8 pages.

* cited by examiner

*Primary Examiner*—J. Allen Shriver, II
*Assistant Examiner*—Bridget Avery
(74) *Attorney, Agent, or Firm*—Polster, Lieder, Woodruff & Lucchesi, L.C.

(57) ABSTRACT

An integrated electric motor hub drive 1 that combines an electric motor subassembly (30), a sunless differential planetary gear drive subassembly (20), and a hub bearing assembly (10) together in a coaxial assembly to provide a compact high gear reduction electric hub drive system.

13 Claims, 3 Drawing Sheets

HIGH REDUCTION RATIO ELECTRIC HUB DRIVE

CROSS-REFERENCE TO RELATED APPLICATIONS

The present invention is related to, and claims priority from, U.S. provisional patent application No. 60/643,564 filed on Jan. 13, 2005, which is herein incorporated by reference.

TECHNICAL FIELD

The present invention relates generally to vehicle wheel hub drives, and in particular, to an integrated electric motor hub drive that combines an electric motor, a sunless differential planetary gear drive, and a hub bearing assembly together to provide a compact high gear reduction electric hub drive system.

BACKGROUND ART

Hub drives have a wide range of applications for swing, lift, final drive and wheel drive. With the growing trend toward electrification, high reduction-ratio hub drives, using electric motors, are in great demand. A high reduction-ratio hub drive offers greater torque leverage, allowing the driving electric motor to be downsized. There are many types hub drives. Two-stage planetary gear drive is a typical example of hub drive. They often are quite complex in design and not fully integrated with the electric motors as required to conserve space and weight.

Accordingly, there is a need in the industry for a compact hub drive with an integrated electric motor advantageously conserving space and saving weight within the vehicle wheel hub.

SUMMARY OF THE INVENTION

Briefly stated, the present invention sets forth an integrated electric motor hub drive that combines an electric motor, a sunless differential planetary gear drive, and a hub bearing assembly together to provide a compact, high gear-reduction electric hub drive system.

The foregoing and other objects, features, and advantages of the invention as well as presently preferred embodiments thereof will become more apparent from the reading of the following description in connection with the accompanying drawings.

BRIEF DESCRIPTION OF THE DRAWINGS

In the accompanying drawings which form part of the specification.

Corresponding reference numerals indicate corresponding parts throughout the several figures of the drawings.

BEST MODES FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
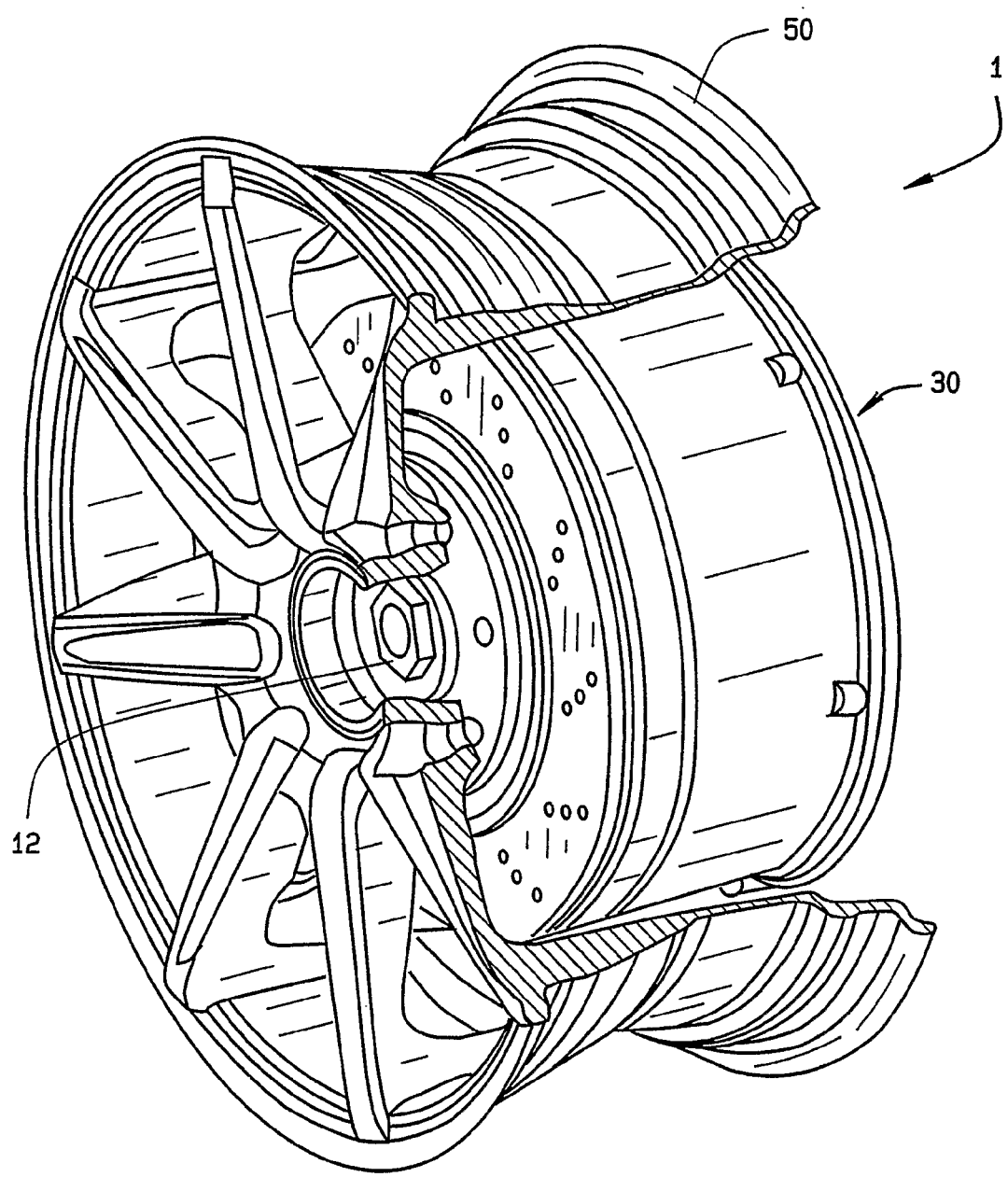
FIG. 1 is a partial sectional view of a vehicle wheel rim within which an integrated electric motor hub drive of the present invention is installed.
Figure 2:
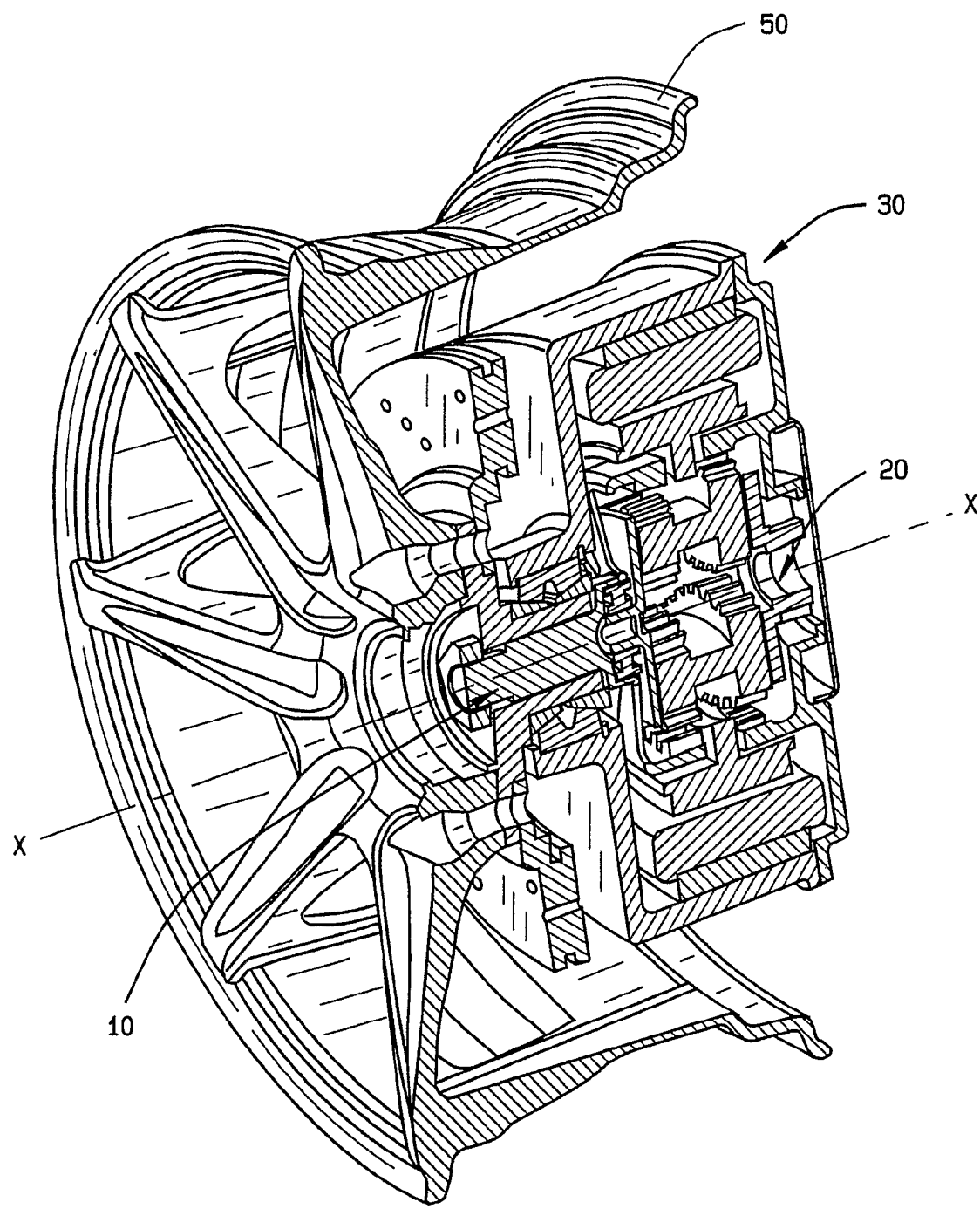
FIG. 2 is a cross-sectional view of the vehicle wheel rim and integrated electric motor hub drive of FIG. 1.

Referring to FIGS. 1 and 2, a high ratio electric hub drive 1 comprising a hub bearing sub-assembly 10, a planetary gear sub-assembly 20, and an electric motor sub-assembly 30, is shown in operable relationship to a vehicle wheel rim 50.

Figure 3:
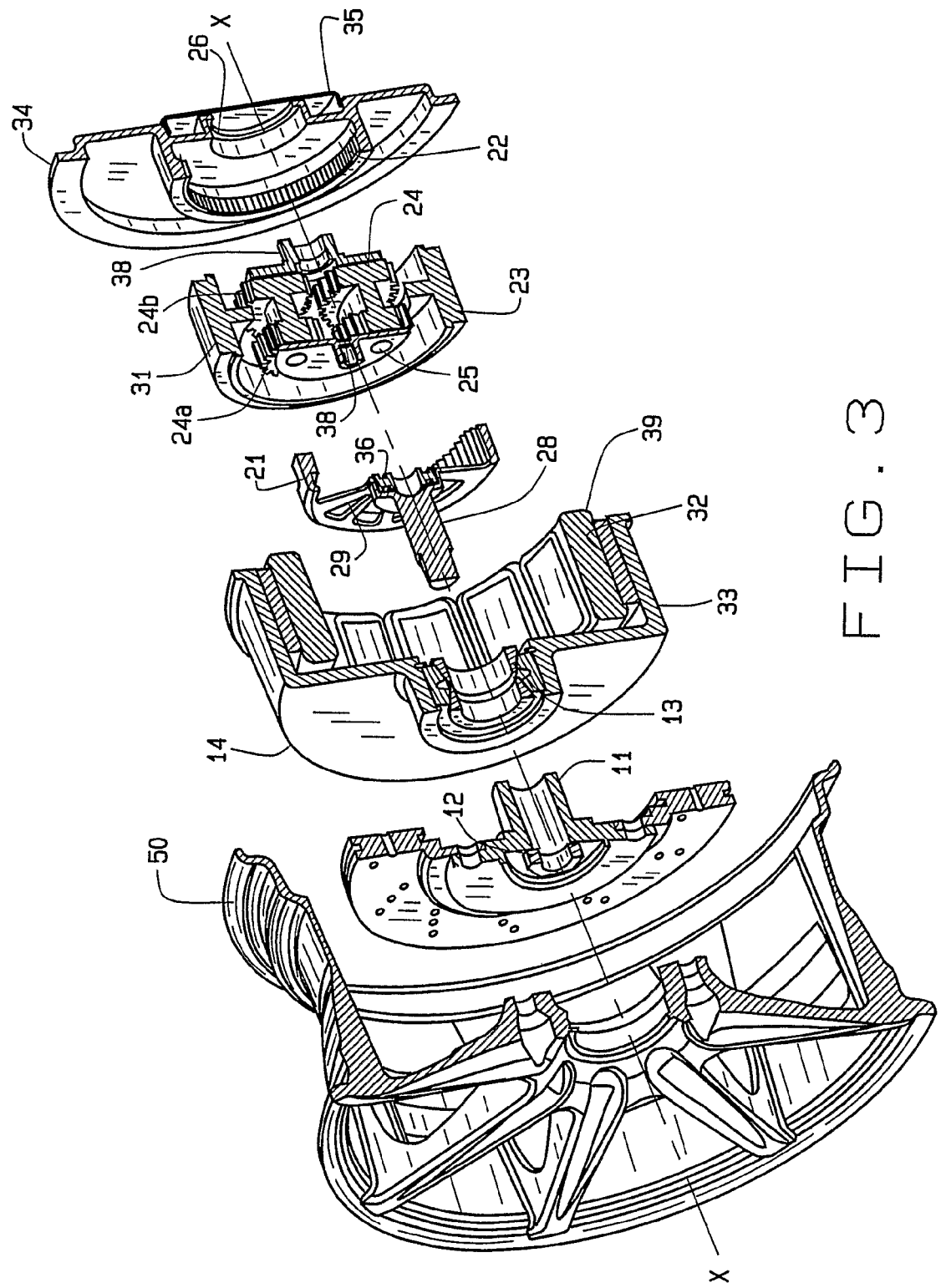
FIG. 3 is an exploded sectional view of the vehicle wheel rim and integrated electric motor hub drive of FIG. 2.

Referring to FIG. 3, the hub bearing sub-assembly 10 comprises a hub spindle 11, a tightening nut 12 threaded onto a drive shaft 28, a double-row package bearing 13, and a housing 14. The hub spindle 11 is supported by the package bearing 13 coaxially within housing 14, which, in turn, is secured to a supporting structure such as the vehicle (not shown) through a mounting flange portion of the housing 14.

The planetary gear sub-assembly 20 is comprised of a driving ring gear 21, a stationary ring gear 22, and a carrier 23 that carries a set of planetary clusters 24. Each planetary cluster 24 comprises two planetary gears 24a and 24b which are supported on the carrier 23 by a pin shaft 25 through a set of bearings. The carrier 23 is supported on the stationary ring gear 22 by a coaxial bearing 26. The driving ring gear 21 is coupled to the splined drive shaft 28 which fits through, and drives, the hub spindle 11. The drive ring gear 21 is coupled to the splined drive shaft 28 by a set of thin spokes 29 that are capable of transferring a substantial amount of toque from the ring gear to the splined drive shaft 28, and yet are flexible enough for allowing some degree of axial misalignment between the drive ring gear 21 and the splined drive shaft 28. The stationary ring gear 22 is rigidly secured to the housing 14 by a back plate 34.

The electric motor sub-assembly 30 consists of a rotor 31 coupled to the carrier 23, a stator 32 disposed circumferentially about the rotor 31, and a motor case 33 integral with the housing 14 supporting the stator 32. The rotor 31 is supported on a rotor shaft 38. One end of the rotor shaft 38 is firmly fastened to the carrier 23 where the rotor shaft is supported, together with carrier 23, through the bearing 26 to the stationary ring gear 22. The other end of the rotor shaft 38 is supported by a tail bearing 36 on the drive shaft 28. The stator 32 has a set of windings 39, and is fixed to motor case 33. The back end of the motor case is mounted to the back plate 34 of the stationary ring gear 22, and a cover cup 35 is bolted axially to the back plate 34 to seal bearing 26.

When supplied with electric power, the rotor 31 of the electric motor sub-assembly 30 rotates about the axis X, driving the rotor shaft 38 and the carrier 23 along with the planetary clusters 24 to rotate at the same speed. Since planetary gears 24a and 24b in the planetary cluster engage respectively with the ring gear 21 and the ring gear 22, a differential rotation is experienced between the two ring gears 21 and 22. Because the ring gear 22 is fixed to the housing 14 through the back plate 34 and motor case 33, the rotational speed of ring gear 21, and thus the hub 11, is small even when the rotational speed of the rotor shaft 38 and the carrier 23 is high. Thus a high speed-reduction ratio between the rotor 31 and the hub 11 is achieved. The speed reduction ratio is given by:

$$SR = \frac{K_2}{K_2 - K_1}$$

where:

$$K_1 = \frac{N_{A1}}{N_{P1}}; K_2 = \frac{N_{A2}}{N_{P2}}$$

$N_{A1}$=teeth number of driving ring gear 21,
$N_{A2}$=teeth number of stationary ring gear 22,
$N_{P1}$=teeth number of planet gear 24a, and
$N_{P2}$=teeth number of planet gear 24b.

The hub 11 and the drive shaft 28 of ring gear 21 are firmly supported by the bearing 13, which may be a high capacity two-row bearing. The hub 11 can thus withstand a substantial amount of radial, axial, and combined external loads as, for example are commonly seen in wheel-end applications where a wheel rim 50 and associated braking structures are mounted directly to the hub 11, such as shown in FIGS. 1-3. Misalignment between the ring gear 21 and the drive shaft 28 caused by the deflection of hub bearing sub-assembly under heavy external loads is accommodated by flexure of the radial spokes 29. The proper engagement between ring gear 21 and the planet gears 24b is thus maintained.

Those of ordinary skill in the art will recognize that variations can be made in the embodiments of the present invention illustrated herein without departing from the scope of the invention, i.e., a highly integrated gear and hub bearing assembly providing a unique arrangement that allows for a high ratio differential gear set be placed coaxially within an electric motor, making the assembly highly compact, and providing a high speed ratio. Deflectable spokes accommodate misalignment while allowing transmission of high drive torque.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A vehicle wheel hub drive system comprising:
a hub bearing assembly including a hub spindle;
a differential planetary gear drive operatively coupled to said hub bearing assembly to rotationally drive said hub spindle, said differential planetary gear drive including a stationary ring gear, a carrier, and a set of planetary clusters;
an electric motor coaxially surrounding said differential planetary gear drive, said electric motor operatively coupled to said differential planetary gear drive to rotationally drive a driving ring gear of said differential planetary gear drive;
wherein said stationary ring gear is operatively coupled to a fixed support structure;
wherein said carrier supports said set of planetary clusters in engagement with said driving ring gear and said stationary ring gear;
wherein said driving ring gear is coupled to a coaxial shaft by a plurality of spokes configured to transfer torque from said driving ring gear to said coaxial shaft; and
wherein said coaxial shaft is operatively coupled to said hub spindle.

2. The vehicle wheel hub drive system of claim 1 wherein said electric motor includes a rotor operatively coupled to a driven component of said differential planetary gear drive; and
a stator operatively coupled to a fixed support structure.

3. The vehicle wheel hub drive system of claim 1 wherein each planetary cluster in said set of planetary clusters includes a first planetary gear in engagement with said driving ring gear, and a second planetary gear in engagement with said stationary ring gear.

4. The vehicle wheel hub drive system of claim 1 wherein each of said spokes is flexible.

5. The vehicle wheel hub drive system of claim 1 wherein said plurality of spokes are configured to accommodate axial misalignment between said coaxial shaft and said driving ring gear.

6. The vehicle wheel hub drive system of claim 3 wherein said planetary gear drive provides a rotational speed reduction ratio between said electric motor and said hub spindle given by:

$$SR = \frac{K_2}{K_2 - K_1}$$

where:

$$K_1 = \frac{N_{A1}}{N_{P1}}; K_2 = \frac{N_{A2}}{N_{P2}}$$

$N_{A1}$=teeth number of said driving ring gear,
$N_{A2}$=teeth number of said stationary ring gear,
$N_{P1}$=teeth number of said first planetary gear in each of said planetary clusters, and
$N_{P2}$=teeth number of said second planetary gear in each of said planetary clusters.

7. The vehicle wheel hub drive system of claim 3 wherein each of said first and second planetary gears in a planetary cluster are operatively coupled together for rotation about a common axis.

8. A vehicle wheel hub drive system comprising:
a hub bearing assembly including a hub spindle;
a differential planetary gear drive operatively coupled to said hub bearing assembly to rotationally drive said hub spindle, said differential planetary gear drive including a stationary ring gear, a carrier, and a set of planetary clusters;
an electric motor coaxially surrounding said differential planetary gear drive, said electric motor operatively coupled to said differential planetary gear drive to rotationally drive a driving ring gear of said differential planetary gear drive;
wherein said driving ring gear is operatively coupled to said hub spindle by a plurality of flexible spokes;
wherein said stationary ring gear is operatively coupled to a fixed support structure;
wherein said carrier supports said set of planetary clusters in engagement with said driving ring gear and said stationary ring gear; and
wherein said carrier includes axial bearing seats configured to receive coaxial bearings adapted to support said carrier within said stationary ring gear and within an end of a coaxial shaft coupled to said hub spindle.

9. The vehicle wheel hub drive system of claim 8 wherein said driving ring gear is operatively coupled, by at least one coupling member, to transfer torque to said hub spindle via a coaxial shaft.

10. The vehicle wheel hub drive system of claim 8 further including a housing enclosing said electric motor, said housing including a back plate supporting a stationary ring gear of said differential planetary gear drive; and a cover cup disposed coaxially on said back plate, said cover cup sealing an axial opening within said back plate and defining an enclosed annular space external to said back plate for housing at least one sensor.

11. The vehicle wheel hub drive system of claim 9 wherein said coaxial shaft and said hub spindle are operatively engaged to set a double-row package bearing supporting said hub bearing assembly within a housing.

12. A vehicle wheel hub drive system comprising:
- a hub bearing assembly including a hub spindle;
- a differential planetary gear drive operatively coupled to said hub bearing assembly to rotationally drive said hub spindle;
- an electric motor coaxially surrounding said differential planetary gear drive, said electric motor operatively coupled to said differential planetary gear drive to rotationally drive a driving ring gear of said differential planetary gear drive
- wherein said driving ring gear is coupled to a coaxial shaft by a plurality of spokes configured to transfer torque from said driving ring gear to said coaxial shaft, said coaxial shaft operatively coupled to said hub spindle; and
- wherein said plurality of spokes are is flexible to accommodate axial misalignment between said coaxial shaft and said driving ring gear.

13. An improved vehicle wheel hub drive system including a hub bearing assembly with a hub spindle rotationally driven via a drive shaft by a driving ring gear of a differential planetary gear drive, comprising:
- an electric motor disposed coaxially about an outer circumference of the differential planetary gear drive, said electric motor operatively coupled to said differential planetary gear drive to rotationally drive the driving ring gear;
- wherein said driving ring gear is configured to accommodate axial misalignment between an axis of rotation of the driving ring gear and an axis of rotation of the drive shaft; and
- wherein said driving ring gear is operatively coupled to the drive shaft by at least one flexible radial spoke.

* * * * *